Figure 1:
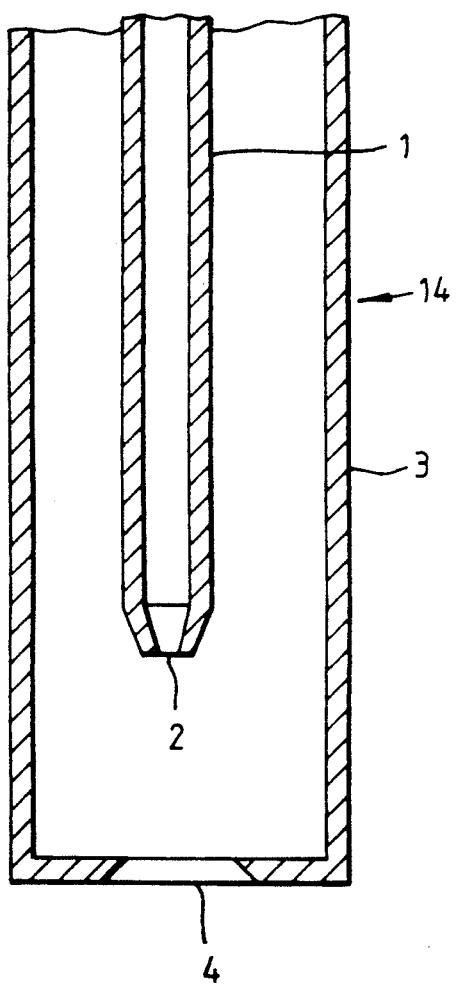

United States Patent [19]

Moody et al.

[11] Patent Number: 5,206,879
[45] Date of Patent: Apr. 27, 1993

[54] DESTRUCTION PROCESS

[75] Inventors: John R. Moody; Allan P. George, both of Billingham; Robert H. Peeling, Stockton On Tees; Stephen M. Jones, Middlesbrough, all of England

[73] Assignee: Tioxide Group Services Limited, London, England

[21] Appl. No.: 734,459

[22] Filed: Jul. 23, 1991

[30] Foreign Application Priority Data

Aug. 3, 1990 [GB] United Kingdom ............... 9017146

[51] Int. Cl.$^5$ .............................................. H05B 7/00
[52] U.S. Cl. ......................................... 373/22; 373/18; 373/24; 373/25; 219/121.48; 219/121.5; 75/10.19; 110/250; 110/346; 252/626; 252/632; 422/186.23
[58] Field of Search ............... 373/18, 22, 25, 24; 219/121.48, 121.49, 121.5, 121.51; 110/346, 250, 235; 75/10 R; 252/626, 630, 632; 422/186.23

[56] References Cited

U.S. PATENT DOCUMENTS

| 4,438,706 | 3/1984 | Boday ............................. 110/238 |
| 4,466,824 | 8/1984 | Gauvin et al. ................... 75/10 R |
| 4,479,443 | 10/1984 | Faldt et al. ..................... 110/346 |
| 4,509,434 | 4/1985 | Boday ............................. 110/238 |
| 4,582,004 | 4/1986 | Fey et al. ........................ 110/346 |
| 4,644,877 | 2/1987 | Barton et al. ................... 110/250 |
| 4,978,477 | 12/1990 | Larsen et al. ................... 252/626 |
| 4,980,092 | 12/1990 | Pineau et al. ................... 252/632 |
| 5,010,829 | 4/1991 | Kulkarni ......................... 110/346 |
| 5,046,436 | 9/1991 | Fowler ............................ 110/349 |
| 5,090,340 | 2/1992 | Burgess ........................... 110/346 |
| 5,108,718 | 4/1992 | Dummersdorf et al. ...... 422/186.23 |

FOREIGN PATENT DOCUMENTS

| 338927 | 10/1989 | European Pat. Off. |
| 354731 | 2/1990 | European Pat. Off. |
| 2235092 | 1/1975 | France. |
| 2113815 | 8/1983 | United Kingdom. |
| 2152949 | 8/1985 | United Kingdom. |
| 2164733 | 3/1986 | United Kingdom. |
| 2222600 | 3/1990 | United Kingdom. |
| 2226552 | 7/1990 | United Kingdom. |
| WO82/00509 | 2/1982 | World Int. Prop. O. |

Primary Examiner—Bruce A. Reynolds
Assistant Examiner—Tu Hoang
Attorney, Agent, or Firm—Baker & Botts

[57] ABSTRACT

Chemical waste is burned in oxygen using an electric plasma flame to heat a stream of gas which contains at least 70% by weight oxygen. Liquid waste in fine droplet form is introduced into the gas stream via a two-fluid atomizer using a carrier gas also preferably oxygen. The total amount of oxygen present is at least 30% more than required for complete combustion of the liquid waste. The reaction mixture is maintained at a temperature of at least 1450° C. for a time of at least 2 milliseconds prior to cooling rapidly of the reaction products to a temperature below 300° C.

12 Claims, 2 Drawing Sheets

DESTRUCTION PROCESS

This invention relates to a process for destruction of chemical waste by oxidation. In particular it relates to destruction of liquid chemical waste by oxidation in a plasma flame.

Currently waste products from chemical processes occur in large quantities in all industrialised nations. These waste products may contain highly toxic or carcinogenic compounds as well as compounds suspected as being genetically active. Many of these compounds (e.g. polychlorinated biphenyls) also have high chemical and thermal resistance. Furthermore these compounds can be hazardous to man and the environment even at very low concentrations and some of the chemicals formed when they are decomposed are also hazardous. Consequently the attainment of a process for the destruction of these compounds in a safe and efficient manner is extremely desirable.

According to this invention a process for the destruction of chemical waste comprises forming an electric plasma flame by heating a stream of gas by means of an electric discharge said gas comprising at least 70% by weight oxygen, introducing the waste in liquid form by means of a two-fluid atomiser into the vicinity of the plasma flame, introducing oxygen into the vicinity of the flame in an amount sufficient to ensure a reaction mixture of oxygen and liquid waste in which the total amount of oxygen is at least 30% more than that required for complete combustion of the liquid waste, maintaining the reaction mixture at a temperature of at least 1450° C. for at least 2 milliseconds and subsequently cooling rapidly the reaction products obtained to below 300° C.

The plasma flame used in the method of the invention is generated in a gas which is comprised of at least 70% by weight of oxygen. Preferably the gas contains at least 90% oxygen by weight and, most preferably the gas is commercially pure oxygen. The use of such pure oxygen enables a more efficient use of heat since no inert carrier gas is heated. Oxygen is also preferably to an air/oxygen mixture since toxic oxides of nitrogen can be formed when the latter is used as a plasma gas.

The efficient destruction of the waste is ensured in the process of the invention by employing an amount of oxygen which is at least 30% more than that required for complete combustion of the waste. The use of substantially pure oxygen as a plasma gas helps to achieve the presence of the correct amount of oxygen without the need to introduce large quantities of oxygen additional to the plasma gas. Depending upon the amount and nature of the waste it is possible to operate the process of the invention without the addition of further oxygen other than that used as a plasma gas. The total amount of oxygen used is preferably between 30% and 50% more than that required for complete combustion of the waste.

The plasma flame may be formed in the stream of gas by any suitable means which is sufficient to generate the heat necessary to maintain the temperature of the reaction mixture as specified hereinbefore. Preferably the gas is heated by means of a pair of electrodes positioned in the gas stream and supplied with a direct electric current. The energy transferred to the gas stream is from 4 to 14 MJ/kg and is preferably 8 MJ/kg of plasma gas. The mean temperature of the gas in the plasma flame is from 2750° to 3750° C. and is preferably about 3300° C. When a direct current is used to heat the gas a wide range of voltages and currents can be used. Typically the voltage supplied is from 100 to 30,000 V, preferably from 150 to 5000 V and the current is from 50 to 1000 amps and preferably from 100 to 800 amps.

The waste is introduced into the vicinity of the plasma in liquid form. Where the waste is a solid it can be mixed with a liquid, e.g. a liquid waste or other suitable diluent to form a slurry which is then introduced into the vicinity of the plasma flame. Alternatively, when the solid has a suitably low melting point it can be preheated to melt the waste before introduction into the vicinity of the plasma flame.

In the process of the invention the waste is introduced by means of a two-fluid atomiser. In the atomiser the waste is pumped through a fine nozzle and a flow of carrier gas is caused to impinge coaxially upon the waste as it emerges from the nozzle. The liquid waste is broken up into fine droplets dispersed in the carrier gas. If desired, a multiplicity of two-fluid atomisers is employed.

The carrier gas can be any convenient gas e.g. nitrogen or air but it is preferably to use oxygen as this contributes to the oxygen needed for the combustion of the waste.

As stated above the liquid waste is broken up into fine droplets by the action of the carrier gas. The size of these droplets depends upon the ratio of the flow rates of waste and carrier gas. Typically a ratio of from 0.1:1 to 0.3:1 by weight carrier gas:waste is employed and the mean particle size of the droplets ranges from 100 to 750 microns.

The total amount of oxygen required for effecting the destruction of the waste in the process of the invention is at least 30% more than that theoretically required for complete combustion of the waste and preferably is between 30 and 50% more than that theoretically required. Some or all of this oxygen is introduced as a plasma gas. Additional oxygen can be added as a carrier gas for the waste and, when necessary, oxygen is added at a point close to that at which the waste is added.

Any convenient design of reactor can be used but a preferred reactor consists of a tube in which the plasma flame is introduced centrally at one end and the waste and any additional oxygen is introduced radially at the same end. The design of the reactor will depend upon the rate of introduction of the waste and the temperature of the gas in the plasma flame but it is designed to ensure that the reaction mixture is maintained at a temperature of at least 1450° C. for at least 2 milliseconds. Preferably the design is such that the reaction mixture is held at 1450° C. or above for at least 4 milliseconds.

The temperatures are controlled by balancing the calorific value of the waste feed and the plasma power input. When the calorific value is low more plasma power is required.

The reactor can be constructed from any convenient material which is capable of withstanding the temperatures generated in the reactor and the corrosion caused by the feed or products of decomposition. The reactor is constructed from metal or metal fitted with a ceramic liner. This ceramic may be silica, an alumino-silicate cement, zircon and zirconia for example. Normally it is necessary to cool the walls of the reactor and this can be carried out by means of a jacket through which air or water is passed. The design of the cooling system is such that the correct reactor temperature for rapid decomposition of the waste is maintained but the reactor wall exposed to the reactor does not suffer thermal or corrosive damage.

The waste is rapidly converted into combustion products in the reactor and the ensuing reaction mixture flows through the reactor away from the plasma flame. When the products emerge from the reactor they are cooled as rapidly as possible to below 300° C. and preferably below 100° C. Rapid cooling avoids conditions promoting the formation of toxic reaction products such as dioxins at intermediate temperatures, typically between 300° and 600° C. A preferred method for cooling is by spraying an aqueous cooling liquid through a venturi into the reaction products as they emerge from the reactor. The venturi can be aligned so as to direct the flow of cooling liquid in a direction to assist the flow of reaction products away from the plasma flame.

The reaction products are treated by any suitable means before discharge to the atmosphere in order to remove any hazardous products such as hydrogen chloride.

Figure 2:
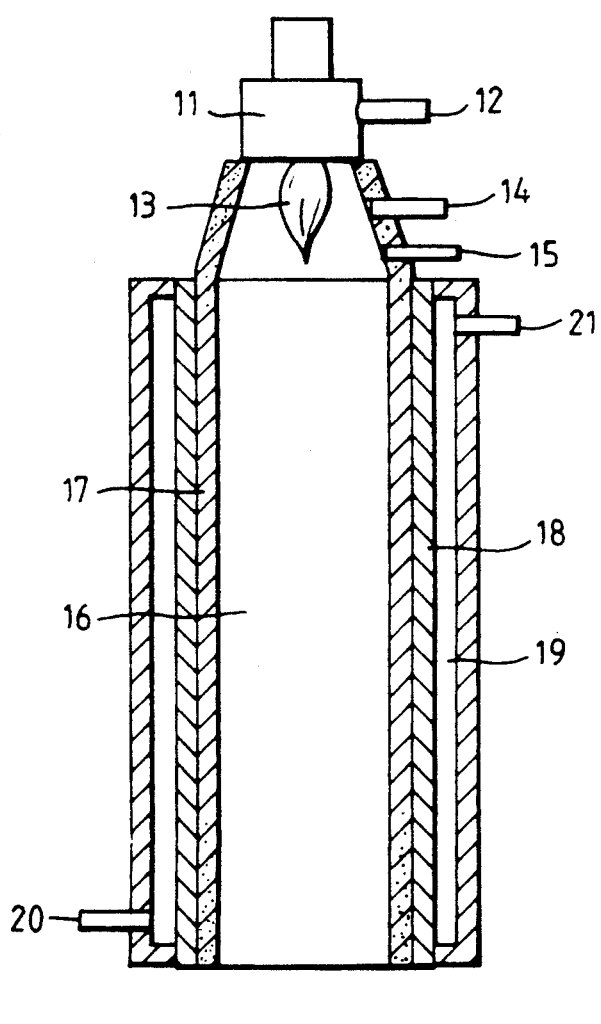
Figure 3:
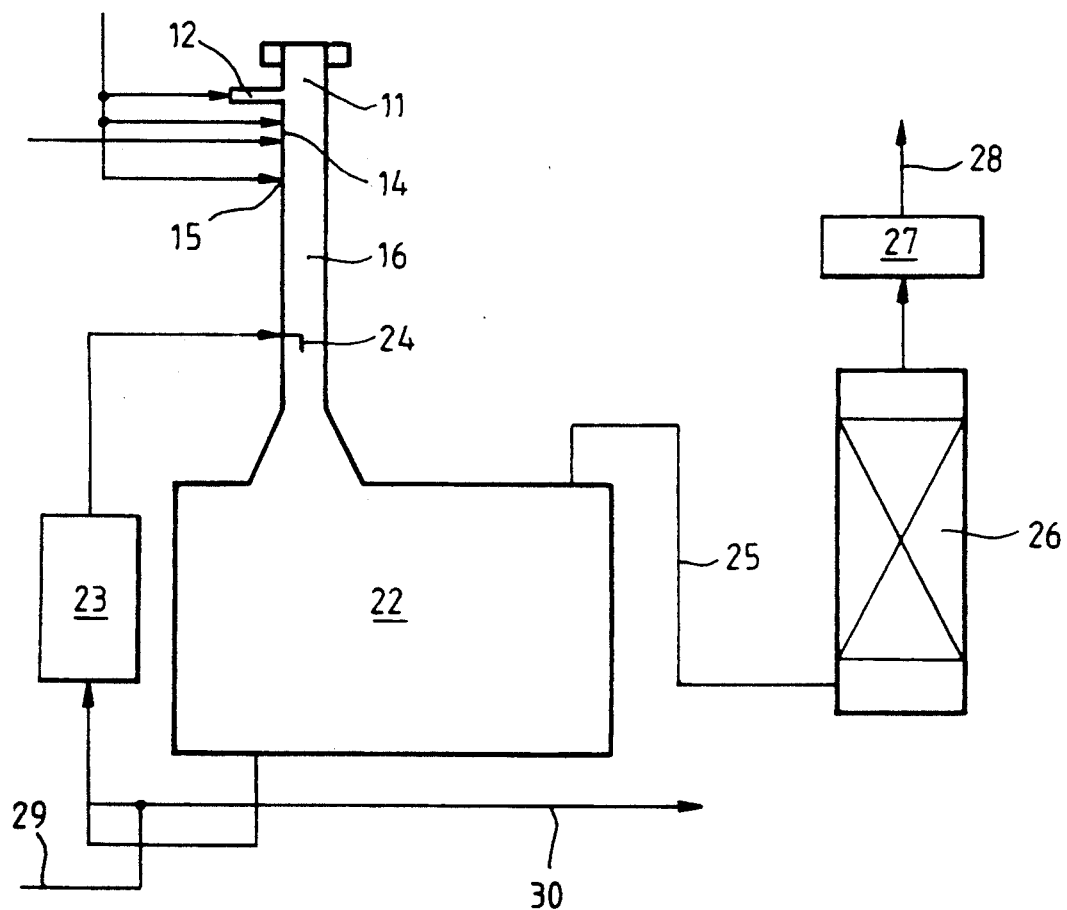

One particular apparatus for carrying out the process of the invention will now be described by way of example only with reference to the accompanying drawings in which FIG. 1 is a diagramatic cross-section of a two-fluid atomiser, FIG. 2 is a diagramatic cross-section of the reaction section of the apparatus, and FIG. 3 is a schematic representation of the apparatus.

Referring to FIGS. 2 and 3 the plasma gas. A two-fluid atomiser 14, shown in more detail in FIG. 1 is positioned close to the plasma flame 13. The atomiser 14 consists of a tube 1 equipped with a nozzle 2 at one end and surrounding by a coaxial tube 3 equipped with a nozzle 4. A pipe 15 for introducing any necessary oxygen is also positioned close to the plasma flame 13. The plasma gun is positioned on the top of a cylinder reactor 16 which is equipped with a removable ceramic liner 17. The main body 18 of the reactor is fabricated from steel and has an internal space 19 through which cooling water can be passed by means of tubes 20 and 21.

A venturi 24 is attached to the lower end of reactor 16 and the plasma gun, reactor and venturi assembly is mounted on a sump tank 22. The sump tank is equipped with a means to circulate its contents to the venturi 24 via a heat exchanger 23, a pipe 29 for introducing a neutralising agent and a drain line 30. A vent line 25 leads from the top of the sump tank 22 to a scrubbing tower 26. The scrubbing tower is equipped with a vent line 28 which communicates with the atmosphere via a gas analyser 27.

In the process of the invention oxygen gas is passed through pipe 12 into the plasma gun 11 where it is heated by a direct current passed between a pair of electrodes (not shown) and forms a plasma flame 13. Waste is introduced into the vicinity of the plasma flame along tube 1 of the two-fluid atomiser 14. Simultaneously oxygen is passed through tube 3 and impinges upon the waste emerging through nozzle 2 to form a fine spray which is then emitted through nozzle 4. If necessary, additional oxygen is passed through pipe 15 so as to ensure that the total amount of oxygen present is at least 30% more than that required for complete combustion of the waste. The reaction mixture passes into the reactor 16 which is cooled, if necessary, by passing water through the internal space 19. The rate of flow of oxygen and waste and the energy input to the plasma flame 13 are adjusted so that the reaction mixture remains at or above 1450° C. in the reactor 16 for at least 2 milliseconds.

The reaction mixture is subsequently cooled rapidly by spraying liquid through venturi 24. This liquid is taken from sump tank 22 and at the start of a run consists of water. When acidic gases are generated by the process as when the waste comprises chlorine-containing substances the liquid absorbs some of these gases. The gases which are not absorbed pass via vent tube 25 to the scrubbing tower 26 where any remaining acidic gases are removed and are emitted to the atmosphere through vent tube 28. The gases emerging from scrubbing tower 26 are continuously monitored by gas analyser 27 to ensure that no hazardous gases are emitted to the atmosphere. The contents of sump tank 22 are neutralised by a base introduced through pipe 29 before being discharged to drain through drain line 30.

The invention is illustrated by the following examples.

EXAMPLE 1 (Comparative)

A direct current plasma was established in oxygen flowing at a rate of 3.81 mole/min. through a pair of electrodes supplied with direct electric current sufficient to raise the temperature of the gas to a means value of 3370° C. When the reactor positioned below the plasma inlet had stabilised in temperature a solution of ethyl alcohol in water, molar ratio 0.08:1 was introduced into the plasma tail flame via a multiplicity of two-fluid atomisers at a total mass flow rate of 0.87 Kg/min. with an atomising oxygen flow rate of 3.65 mole/min. Additional oxygen, sufficient to provide 14.8% more than that theoretically required for complete combustion of the ethyl alcohol, was also injected in the vicinity of the plasma flame. The bore of the water cooled, ceramic lined reactor was 29 mm, resulting in an estimated mean gas residence time of 2.86 msec and temperature of 1114° C.

At the exit to the reactor the gas mixture was rapidly cooled by spraying an aqueous liquid through a venturi into the gas stream. This liquid was collected in a sump tank from whence it could be recirculated to the venturi. Gas which was not condensed by this cooling liquid was passed to atmosphere through a gas analyser.

The destruction efficiency of the ethyl alcohol, determined by sampling and analysis of the sump tank liquid and exhaust gas, expressed as $$\frac{\left(\frac{\text{Total weight}}{\text{ethanol fed}} - \frac{\text{ethanol recovered}}{\text{from effluents}}\right) \times 100}{\text{Total weight ethanol fed}} \text{ was } 99.00\%.$$

The combustion efficiency of the system, expressed as $$\frac{CO_2 \text{ concentration in exhaust gas} \times 100}{CO_2 \text{ concentration in exhaust gas} + CO \text{ concentration in exhaust gas}} \text{ was } 99.23\%$$

EXAMPLE 2

Example 1 was repeated using an increased molar ratio of ethyl alcohol:water of 0.108:1 in the liquid feed, a liquid mass flow rate of 0.72 kg/min., total oxygen sufficient to provide 49.5% more than that theoretically required for complete combustion of the ethyl alcohol and a ceramic lines reactor of 34 mm bore. The estimated mean gas residence time was 4.14 msec and temperature 1487° C.

Destruction efficiency of the ethyl alcohol, determined as in Example 1, was 99.85% and the combustion efficiency, as determined in Example 1, was 99.76%.

EXAMPLE 3

Example 2 was repeated using total oxygen sufficient to provide 33% more than that theoretically required for complete combustion of the ethyl alcohol. The estimated means gas residence time was 4.26 msec and temperature 1494° C.

Destruction efficiency of the ethyl alcohol, determined as in Example 1, was 99.87% and the combustion efficiency, as determined in Example 1, was 99.39%.

EXAMPLE 4 (Comparative)

Example 2 was repeated using total oxygen sufficient to provide 19.7% more than that theoretically required for complete combustion of the ethyl alcohol. The estimated means gas residence time was 3.86 msec and temperature 1517° C.

Destruction efficiency of the ethyl alcohol, determined as in Example 1, was 99.87%, but the combustion efficiency, as determined in Example 1, was reduced to 98.42%.

The process of this invention can easily be operated using a fixed plant or utilising equipment adapted to be readily transported to and operated at a place where the waste arises. Mobile equipment enables hazardous wastes to be destroyed without the risks associated with transportation of such wastes.

We claim:

1. A process for the destruction of chemical waste comprising the steps of forming an electric plasma flame by heating a stream of gas by means of an electric discharge, said gas comprising at least 70% by weigh oxygen, introducing the chemical waste in liquid form by means of a two-fluid atomiser into the electric plasma flame, introducing an amount of oxygen into the electric plasma flame to form a reaction mixture of oxygen and chemical waste, the amount of oxygen being sufficient to ensure that the total amount of oxygen in the reaction mixture is at least 30% more than required for complete combustion of the chemical waste, maintaining the reaction mixture at a temperature of at least 1450° for at least 2 milliseconds and subsequently cooling rapidly the reaction mixture to below 300° C.

2. A process according to claim 1 in which the stream of gas contains at least 90% by weight of oxygen.

3. A process according to claim 1 in which the total amount of oxygen is from 30% to 50% more than required for complete combustion.

4. A process according to claim 1 in which the reaction mixture is maintained at a temperature of at least 1450° C. for at least 4 milliseconds.

5. A process according to claim 1 in which energy is transferred to the stream of gas from the plasma flame in an amount from 4 MJ to 14 MJ per kilogram of said gas.

6. A process according to claim 1 in which the gas in the plasma flame has a mean temperature from 2750° to 3750° C.

7. A process according to claim 1 in which the plasma flame is generated by an arc between a pair of electrodes supplied with direct electric current having a voltage from 100 to 30,000 volts and an amperage from 50 to 1000 amps.

8. A process according to claim 1 in which the chemical waste is introduced as droplets in a carrier gas present in an amount wherein the weight ratio of carrier gas with respect to chemical waste is from 0.1:1 to 0.3:1.

9. A process according to claim 8 in which the droplets have a size from 100 to 750 microns.

10. A process according to claim 8 in which the carrier gas is nitrogen.

11. A process according to claim 8 in which the carrier gas is oxygen.

12. A process according to claim 1 in which reaction products obtained are cooled by spraying an aqueous cooling liquid into the reaction products through a venturi.

* * * * *